(12) United States Patent
Horiuchi et al.

(10) Patent No.: US 7,776,773 B2
(45) Date of Patent: *Aug. 17, 2010

(54) BORON CARBIDE SINTERED BODY AND METHOD OF MANUFACTURING THE SAME AND PROTECTIVE BODY

(75) Inventors: Nobuyuki Horiuchi, Kagoshima (JP);
Teppei Kayama, Kagoshima (JP);
Masahito Nakanishi, Kagoshima (JP);
Takehiro Oda, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 230 days.

This patent is subject to a terminal disclaimer.

(21) Appl. No.: 11/946,783

(22) Filed: Nov. 28, 2007

(65) Prior Publication Data
US 2008/0227618 A1 Sep. 18, 2008

(30) Foreign Application Priority Data
Nov. 29, 2006 (JP) ............................. 2006-320965

(51) Int. Cl.
*C04B 35/563* (2006.01)
*C04B 35/577* (2006.01)
*F41H 5/00* (2006.01)

(52) U.S. Cl. ............................. 501/87; 501/90; 501/91; 501/99; 89/36.02

(58) Field of Classification Search .................. 501/87, 501/90, 91, 99; 89/36.02
See application file for complete search history.

(56) References Cited

U.S. PATENT DOCUMENTS

| 4,195,066 | A | * | 3/1980 | Schwetz et al. | ............. 423/291 |
| 4,524,138 | A | * | 6/1985 | Schwetz et al. | ................ 501/90 |
| 6,258,741 | B1 | * | 7/2001 | Kohsaka et al. | ................ 501/87 |
| 7,557,054 | B2 | * | 7/2009 | Oda et al. | ...................... 501/90 |

FOREIGN PATENT DOCUMENTS

JP 06087654 * 3/1994

* cited by examiner

*Primary Examiner*—Karl E Group
(74) *Attorney, Agent, or Firm*—Birch, Stewart, Kolasch & Birch, LLP

(57) ABSTRACT

A boron carbide sintered body having a plurality of pores, comprises a boron carbide as a main component and a plurality of graphite particles dispersed in the sinter. The graphite particles is exposed to the pores or is in the vicinity of the pores.

20 Claims, 4 Drawing Sheets

BORON CARBIDE SINTERED BODY AND METHOD OF MANUFACTURING THE SAME AND PROTECTIVE BODY

CROSS-REFERENCE TO RELATED APPLICATIONS

The present application claims priority of Japanese Patent Application No. 2006-320965, filed on Nov. 29, 2006. The contents of that application are incorporated herein by reference in their entirety.

BACKGROUND OF THE INVENTION

1. Field of the Invention

The present invention relates to a boron carbide sintered body having high hardness and being excellent in terms of grindability and a method of manufacturing the boron carbide sintered body. The present invention also relates to a protective body that reduces the penetration of a flying object such as a bullet and a shell in order to protect a human body, a vehicle, a ship, or an aircraft. The present invention further relates to a protective body that can be suitably used for a protective barrier or the like for a building.

2. Description of the Related Art

In general, boron carbide is lightweight and has a high hardness near that of diamond and cubic boron nitride, and also high mechanical strength. Thus, boron carbide has been used for abrasion-resistant members. For a boron carbide sintered body, in order to effectively utilize such advantageous high hardness of boron carbide, sinterability of the boron carbide sintered body needs to be sufficiently increased. Boron carbide, however, is a sintering-resistant material. Thus, it has been difficult to sufficiently increase the sinterability of a boron carbide sintered body by using a conventional sintering technique. A technique for sufficiently increasing the sinterability of a boron carbide sintered body has been developed.

Japanese Examined Patent Application Publication No. 2-053387 discloses a technique for producing a boron carbide sintered body by pressureless-sintering a fine-grained mixture of α-silicon carbide, boron carbide, carbon, and an organic material that can be coked to form carbon to form a sintered body and then repressurizing the resulting sintered body in a high-pressure autoclave using an inert gas as a pressure-transfer medium.

However, a boron carbide sintered body having higher grindability than that of the boron carbide sintered body disclosed in Japanese Examined Patent Application Publication No. 2-053387 is required while high hardness is maintained.

DETAILED DESCRIPTION OF THE PREFERRED EMBODIMENTS

Figure 1:
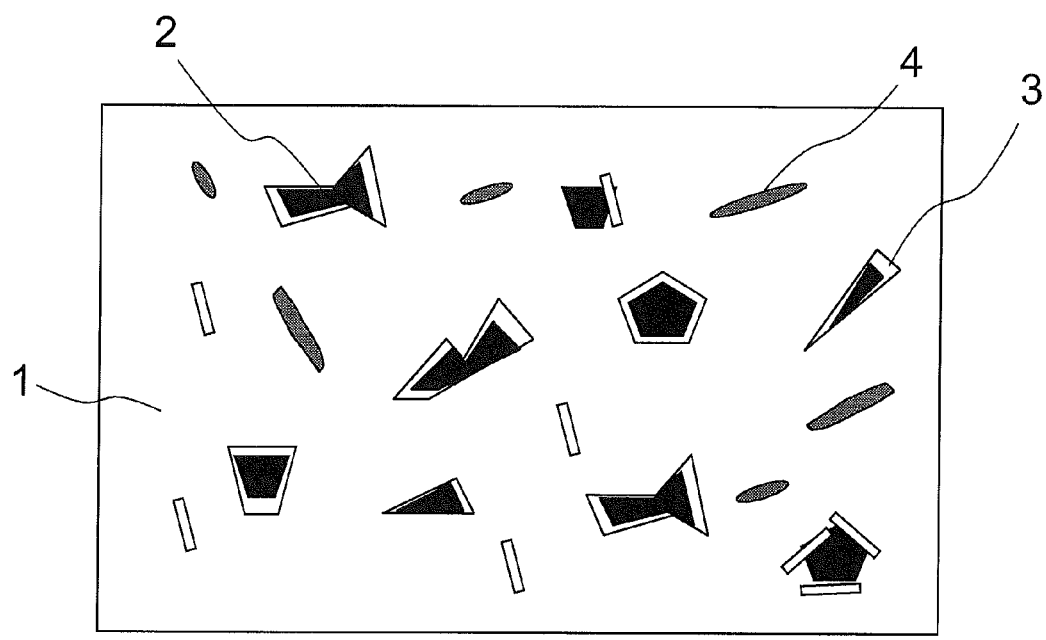
FIG. 1 is a schematic cross-sectional view of a boron carbide sintered body according to an embodiment of the present invention.

According to one aspect of the invention, a boron carbide sintered body having a plurality of pores comprises a boron carbide as a main component and a plurality of graphite particles dispersed in the sinter. The pores of the sintered body are such as forming naturally in the process of making the material of the sintered body. The graphite particles are exposed to the pores or are in the vicinity of the pores.

According to another aspect of the invention, a protective body comprises a plurality of the boron carbide sintered bodies and a substrate on which the sintered bodies are disposed.

According to another aspect of the invention, a method of manufacturing a boron carbide sintered body comprises mixing a boron carbide, graphite, and a silicon carbide to obtain a basic material, and molding a molding material including the basic material to obtain a compact. The method also comprises firing the compact to dissolve the graphite in the compact at a first reference temperature, heating the compact up to a second reference temperature higher than the first reference temperature, and cooling the compact to precipitate the dissolved graphite.

A boron carbide sintered body and a protective body according to an embodiment of the present invention will be described below.

A boron carbide sintered body having a plurality of pores according to this embodiment includes boron carbide as a main component, that is, as the ingredient present in the largest amount (which may be less than 50%), and a plurality of graphite particles disposed in the sintered body. Most of the graphite particles are exposed to the pores or disposed in the vicinity of the pores. A plurality of the graphite particles may be each exposed to one of the pores, but also many pores may contact only one graphite particle. Also, many of the graphite particles may be each disposed in the vicinity of a one of the pores. The expression "vicinity" refers to a region within 40 μm of the circumference of a pore. The same is true hereinafter. When the graphite particles are each disposed within 40 μm of the corresponding one of the pores, a crack often occurs between adjacent pores in grinding because graphite has stiffness lower than that of boron carbide. Thereby, the crack propagates easily between pores.

Silicon carbide is preferably contained in the sintered body. Boron carbide as a main component is lightweight and has high hardness and stiffness. Graphite and silicon carbide function as sintering additives in a step of firing a boron carbide sintered body. That is, graphite and silicon carbide dissolve to form liquid phases during firing, thereby facilitating densification of boron carbide through the mechanism of solid phase sintering. After the heating step, graphite and silicon carbide in the liquid phases present along grain boundaries of boron carbide precipitate in a step of cooling a sintering precursor. Thereby, the boron carbide sintered body having high hardness, stiffness, and compressive strength can be obtained.

Boron carbide can be determined to be a main component by quantitative analysis based on X-ray fluorescence analysis. In other words, boron carbide can be identified to be a main component by determining the fact that the sintered body has a boron carbide content of 50 percent by mass or more. Graphite and silicon carbide in the boron carbide sintered body can be determined by, for example, X-ray diffraction using Cu Kα radiation.

The boron carbide sintered body according to this embodiment has the plurality of pores. Graphite incorporated in the sintered body is mainly exposed to the pores. That is, "exposed" graphite forms a part of the surface surrounding the pore and defining the shape of the pore. "Exposed" graphite particles include those only tangentially contacting a pore. Also, the graphite particles may be disposed in the vicinity of the pores or adjacent to the pores. The number ratio of the graphite particles exposed to the pores to the sum of the exposed graphite particles and the graphite particles in the vicinity of the pores may be not less than 50% and preferably not less than 80%.

When grinding is performed in order to form the boron carbide sintered body into a target shape, a crack often generates from a pore in the sintered body. The crack extends to the vicinity of the pore or to an adjacent pore. As a result, the grinding proceeds. Since the boron carbide sintered body according to this embodiment has the pores, a crack is easily formed with a low stress compared with a dense boron carbide sintered body. That is, a crack can easily propagate from one pore to another pore. Thus, it is possible to obtain a sintered body having good grindability. In almost all graphite particles, at least part of each graphite particle is exposed to one of the pores or is in the vicinity of the pore. Thus, the crack generated from a pore propagates to another pore. In this case, the graphite particles are broken thereby facilitating propagation of the crack to another pore through the graphite particle that is in contact with the circumference of the first pore. In this way, it is possible to obtain the sintered body having good grindability while high hardness, which is one of the characteristics of boron carbide, is maintained.

Grindability of the boron carbide sintered body can be determined by measuring grind resistance values. A reduction in grind resistance increases grindability. Grind resistance is determined by measuring a grind resistance value (N) with a quartz piezo-electric dynamometer when a hole is drilled in a sintered body under predetermined conditions. Specifically, for example, a disk sample having a diameter of 80 mm and a thickness of 10 mm and composed of a boron carbide sintered body is produced. The sample is fixed in a vertical machining center (model VM4II, manufactured by Osaka Kiko Corporation). A drill having an outer diameter of 5 mm and #120 diamond formed by electrodeposition is mounted on the machining center. A hole is drilled in the sample in the direction perpendicular to a main surface of the sample at a number of rotations of the drill of 2,000 rpm and a feed rate of 2 mm/min while water is fed to the drill. The grind resistance (N) generated during drilling is measured with a quartz piezo-electric dynamometer (TYPE9254, manufactured by Kistler Corporation).

The present state of graphite and the distribution of graphite around the pores can be determined by element mapping of carbon with an X-ray microanalyser and observation of a secondary electron image of the surface or polished surface of the cross section of the boron carbide sintered body with an X-ray microanalyser. A secondary electron image magnified 1,000 times of any area on the surface or polished surface is observed to investigate the graphite particles exposed to the pores and the graphite particles in the vicinity of the pores. The number of graphite crystals disposed in a region 100 μm by 80 μm is counted. The number ratio (Rn) of the graphite particles exposed to the pores to the sum of the number of graphite particles exposed to the pores and in the vicinity of the pores is calculated.

The number ratio Rn is preferably 80% or more. Most of (i.e., 80% or more of) graphite particles in the boron carbide sintered body are exposed to the pores, thus increasing the proportion of the graphite particles that contribute to the propagation of a crack. This results in an increase in grindability while the high hardness of the sintered body is maintained. A higher number ratio of the graphite particles exposed to the pores results in higher grindability. If the number ratio of the graphite particles in the sintered body disposed around the pores is excessively high, the degree of dispersion of the graphite particles in the sintered body is reduced. Thus, to keep the high effect of the graphite particles as the sintering additive the number ratio is more preferably 95% or less.

In the boron carbide sintered body according to this embodiment, (Lp/La) is preferably not less than 0.3, where La is a length of circumference of the pore in a cross sectional view, and Lp is a length of the circumference of the exposed graphite particle in the cross sectional view.

FIG. 1 is a schematic cross-sectional view of a boron carbide sintered body according to an embodiment of the present invention. FIG. 1 shows boron carbide 1 as a main component, pores 2, graphite particles 3, and silicon carbide 4. The crystal structure of boron carbide is omitted. Note that some particles can completely surround a pore in the cross section.

The expression "the length La of circumference of the pore in the cross sectional view" refers to a length of the circumference of the pore 2 in the sintered body in a cross sectional view. The expression "the length Lp of the exposed graphite particle 3" refers to a length of the entire circumference of the graphite particle 3 in the sintered body in a cross-sectional view. That is, Lp includes not only the length of the particle portion forming the pore wall, but the whole of its cross-sectional circumference. The ratio (Lp/La) of the lengths is set to not less than 0.3. In other words, the proportion of the graphite particle 3 in the pore is limited. That is, the proportion of the graphite particle 3 exposed to the pores is high. In this case, even when a crack forms or extends in any direction from the pore 2, the existing probability of the graphite particles 3 is high. Thus, it is possible to obtain a sintered body having excellent grindability by virtue of facilitation of crack propagation by using the graphite particles 3 while high hardness is maintained. At a ratio (Lp/La) of less than 0.3, the proportion of the graphite particle 3 in the pore is low, thereby degrading grindability. Furthermore, grindability is easily changed depending on the processing direction. The ratio (Lp/La) is more preferably 0.6 or more, thereby further improving grindability. Note that a graphite particle may completely surround a pore in the cross section, and Lp>La may occur. (E.g., the pentagonal pore and particle in FIG. 1.)

The length La of circumference of the pore in a cross sectional view and the length Lp of the whole circumference of the exposed the graphite particle in the cross sectional view are determined by observing a secondary electron image magnified 1,000 times of any area on the polished surface of the cross section and measuring the lengths by image analysis. In this case, for example, the area has a length of 100 μm and a width of 80 μm.

The cross section may be polished by cross section polish. Specifically, for example, polishing is performed with an apparatus for preparing a scanning electron microscope specimen (cross section polisher, SM-09010, produced by JEOL Ltd.) under the following conditions: an acceleration voltage of argon ions with which the cross section is irradiated is set to 6 kV; the flow rate of an argon gas is controlled in such a manner that a current is 70% to 80% of the maximum of an argon ion current; and the polishing time is 8 hours.

Preferably, the content of graphite in the boron carbide sintered body is not less than 1% and not more than 20% by mass of the sintered body, and the content of silicon carbide is not less than 0.1% and not more than 10% by mass of the sintered body.

Boron carbide has the chemical formula $B_4C$. In general, the molar ratio of boron atoms to carbon atoms, i.e., B/C, is likely to be higher than 4.0, which is the stoichiometric ratio. That is, boron carbide may lack carbon with respect to boron. Thus, densification does not proceed readily by pressureless firing. The above-described graphite content allows the molar ratio B/C to approach 4.0. In this case, densification proceeds even by pressureless firing. The above-described silicon carbide content facilitates densification. Furthermore, porosity can be appropriately controlled. That is, high sinterability is obtained even by pressureless firing. Thereby, it is possible to obtain a high-density, high-hardness sintered body having good grindability. More preferably, the content of graphite is in the range of 5% to 10% by mass of the sintered body. More preferably, the content of silicon carbide is in the range of 0.5% to 5% by mass of the sintered body. In this case, a sintered body having higher hardness can be obtained.

The contents of graphite and silicon carbide in the boron carbide sintered body can be measured by inductively coupled plasma (ICP) spectrometry.

Preferably, the crystal grains of graphite or the whole of the graphite particles has an anisotropic shape. The phrase "anisotropic shape" means a shape having an aspect ratio of more than one, for example, a plate-like, columnar, or needle shape. When a line segment showing the maximum length of the graphite particle in a predetermined cross section is defined as the long axis and when a line segment passing through the center of a long axis and being orthogonal to the long axis is defined as a short axis, the ratio of the length of the long axis to the length of the short axis is defined as the aspect ratio. Such an anisotropic shape of graphite facilitates propagation of a crack in a longitudinal direction (long axis) of the crystal grain of graphite. Thus, a crack generated from the pore can easily propagate in the longitudinal direction of a graphite particle exposed to the pore or of a graphite particle in the vicinity of the pore. Grinding can be performed by repeating the propagation. Therefore, a sintered body having higher grindability can be obtained.

Preferably, the mean maximum length of the graphite crystal grains having the anisotropic shapes is not less than 1 μm and not more than 15 μm. In this case, a crack generated from the pore can more effectively propagate in the vicinity of the pore or adjacent pore, thereby further increasing grindability. At a mean maximum length of less than 1 μm, a crack does not effectively propagate. At a mean maximum length exceeding 15 μm, a crack can propagate but does not easily propagate along a target shape.

A 1,000× secondary electron image of any area on the polished surface of the boron carbide sintered body is observed. The maximum lengths of 25 crystal grains of graphite observed on the polished surface are measured. The mean value thereof is calculated to obtain the mean maximum length of the graphite particles. This polished surface can also be obtained by cross section polish.

Preferably, the boron carbide sintered body according to this embodiment has a porosity of more than 0% and not more than 10%. In the boron carbide sintered body, the graphite particles are exposed to the pores or are in the vicinity of the pores, thereby allowing a crack to propagate efficiently during grinding to increase grindability. Thus, a sintered body having sufficiently high grindability can be obtained without excessively increasing the porosity of the sintered body. In the case where the porosity is set to more than 0% and not more than 10%, grindability can be sufficiently increased while high hardness, which is one of the characteristics of boron carbide, is maintained. In the case where the porosity is set in the range of not less than 1% not more than 6%, a sintered body having sufficiently high hardness and high grindability can be obtained.

The porosity of the sintered body is measured by Archimedes' method according to JIS R 2205, hereby incorporated by reference.

The boron carbide sintered body preferably has a boron content of 70% by mass or more relative to the mass of the sintered body. In this case, a high-hardness sintered body having high mechanical strength can be obtained. The boron content of the boron carbide sintered body can be measured by inductively coupled plasma (ICP) spectroscopy.

A method of manufacturing a boron carbide sintered body according to this embodiment will be described below.

The method of manufacturing the boron carbide sintered body according to this embodiment includes mixing boron carbide, graphite, and silicon carbide to obtain a basic material, molding a molding material including the basic material to obtain a compact, and firing the compact. The steps will be described in detail below.

The mixing step of mixing boron carbide, graphite, and silicon carbide is performed to obtain the basic material.

For example, a boron carbide powder having an average particle size ($D_{50}$) of 0.5 μm to 2 μm is prepared. The boron carbide powder having a stoichiometric molar ratio of B to C (B/C) of 4 (that is, the powder is constituted by particles having a composition of $B_4C$) may be used. Alternatively, material powders described below may be used. Boron carbide ($B_4C$) has a wide solid solution range for B and C. Examples of a commercially available boron carbide powder that can be used include a powder having a molar ratio of B to C (B/C ratio) of 4, which is a stoichiometric ratio; a powder having a B/C from 3.5 to less than 4; and a powder having a B/C ratio from more than 4 to 10. Furthermore, examples of a boron carbide powder that can be used include powders containing $B_{13}C_2$ and/or the like; and powders containing free carbon, boric acid ($B(OH)_3$), boric anhydride ($B_2O_3$), iron (Fe), aluminum (Al), silicon (Si), and/or the like. By incorporating a graphite powder and a silicon carbide powder as sintering additives to these powders, the resulting powders can be sintered by firing without application of mechanical pressure. For example, a boron carbide powder having an average particle size of about 20 μm or a boron carbide powder obtained by preliminarily grinding the powder may be used. The preliminary grinding is preferably performed using a jet mill without milling media in order to reduce contamination with impurities. Preferably, the boron carbide powder is a fine powder and has an average particle size of 0.5 to 2 μm.

A graphite powder and a silicon carbide powder are added to the boron carbide powder. In order that a sintered body to be obtained may have a graphite content of not less than 1% and not more than 20% by mass of the sintered body and a silicon carbide content of not less than 0.1% and not more than 10% by mass of the sintered body, the graphite powder may be added in an amount of not less than 1% not more than 28.5% by mass of the boron carbide powder, and the silicon carbide powder may be added in an amount of not less than 0.1% not more than 14% by mass of the boron carbide powder.

As graphite contained in the boron carbide sintered body, high-crystallinity graphite having a narrow half-width of the (002) face (Mirror indices) is preferably used. As such a graphite powder, for example, a highly orientated pyrolytic graphite (HOPG) powder may be used.

To facilitate sintering, at least one selected from borides of metal elements selected from Group 4, 5, and 6 of the periodic table; and oxides of metal elements selected from Group 3 of the periodic table may be added as a sintering additive in addition to the graphite powder and the silicon carbide powder. Preferred examples thereof include borides such as zirconium boride ($ZrB_2$), titanium boride ($TiB_2$), and chromium boride ($CrB_2$); and oxides such as yttrium oxide ($Y_2O_3$).

The boron carbide powder, the graphite powder, the silicon carbide powder, and the additional sintering additive are charged into a mill, such as a rotation mill, a vibrating mill, or a bead mill, and the mixture is subjected to wet mixing with at least one of water, acetone, and isopropyl alcohol (IPA) to form a slurry. Examples of milling media that can be used include milling media coated with an imide resin; and milling media constituted by sintered bodies composed of boron nitride, silicon carbide, silicon nitride, zirconia, alumina, and the like. The milling media constituted by boron nitride sintered bodies and the milling media coated with an imide resin are preferred because the milling media have less influence when the mixture is contaminated with the milling media as impurities. To reduce the viscosity of the resulting slurry, a dispersant may be added before milling.

The resulting slurry is dried to form a dry powder. Before the drying, the slurry is allowed to pass through a screen having a mesh size of less than #200 to coarse impurities and foreign matter. Preferably, iron and iron compounds are removed with, for example, a magnetic separator using magnetism. Then 1 to 10 parts by mass of an organic binder, such as paraffin wax, polyvinyl alcohol (PVA), polyethylene glycol (PEG), polyethylene oxide (PEO), or an acrylic resin, is added to the slurry relative to 100 parts by mass of the powders in the slurry, thereby reducing the occurrence of cracking, breakage, and the like of a compact to be obtained in the molding step described below. As a method of drying the slurry, a method of heating the slurry in a vessel, a method of drying the slurry with a spray dryer, or another drying method may be used.

Next, the molding step of molding a molding material including the basic material is performed to obtain a compact. In this step, the resulting dry powder is molded by a well-known molding method, such as powder pressing using a forming die or isostatic pressing using hydrostatic pressure. In this case, the molding material is molded into the compact having a desired shape and a relative density of 45% to 70%.

When the compact contains an organic binder, the organic binder may be removed by calcination at a temperature of 500° C. to 900° C. in a nitrogen gas atmosphere.

Next, the step of firing the resulting compact is performed. In this step, the resulting compact is fired in a firing furnace including a resistive heating element formed from graphite. The compact is placed in the firing furnace. Preferably, the compact is placed in a firing vessel (hereinafter, referred to as a "firing jig") capable of surrounding the entire compact. This is to effectively reduce the attachment of foreign matter (for example, carbon chips scattered from the resistance heating element formed from graphite and a carbon heat insulator and pieces of other inorganic heat insulators incorporated in the furnace) in the atmosphere in the furnace to the compact and effectively reduce the release of volatile components from the compact. The firing jig is preferably made of graphite. The firing jig may be made of a silicon carbide sintered body or a composite thereof. Furthermore, the whole of the compact is preferably surrounded by the firing jig.

The compact placed in the firing jig is placed in the furnace and fired in an argon gas, a helium gas, or in vacuum.

The firing step in the method of manufacturing the boron carbide sintered body according to this embodiment includes a dissolving substep of dissolving graphite in the compact at a first reference temperature, and a precipitating substep of heating the compact up to a second reference temperature higher than the first reference temperature and then cooling the compact to precipitate the dissolved graphite. Thereby, most of the graphite particles can be disposed in such a manner that at least part of each graphite particle is exposed to the pores or is in the vicinity of the pores.

At the first reference temperature, silicon carbide and graphite incorporated as the sintering additives dissolves, thereby extending to grain boundaries of boron carbide as the main component. At the second reference temperature higher than the first reference temperature, sintering and grain growth of boron carbide proceed with dissolved silicon carbide and graphite in the liquid phase. Graphite in the liquid phase present at the grain boundaries of boron carbide is gradually transferred to graphite partially precipitated by cooling, thereby forming anisotropic graphite having a columnar shape, plate shape, or the like. The precipitation of graphite leads to the rearrangement of boron carbide, thereby forming pores. As a result, graphite particles are disposed around the pores.

In particular, the dissolution of graphite and the dispersion of graphite to the grain boundaries of boron carbide are controlled by controlling the first reference temperature and a holding time at the temperature, so that the crystal shape of graphite can be adjusted. Thereby, anisotropic graphite having a columnar shape, a plate shape, or the like can be formed. Preferably, the cooling rate is controlled so as to be 800° C./hour to 1,300° C./hour in the temperature range of the second reference temperature to about 1,800° C. in order that the mean maximum length of the crystal of graphite may be in the range of not less than 1 μm to not more than 15 μm. The cooling rate need not be controlled in the temperature range of 1,800° C. to room temperature because the maximum length of the graphite crystal is not affected by the cooling rate in this temperature range.

Preferably, the compact is subjected to pressureless firing. Thereby, a sintered body having a porosity of 10% or less. Furthermore, by controlling the second reference temperature and a holding time at the temperature, sintering can be controlled, and the porosity can be adjusted to not less than 1% and not more than 6%. In addition, it is possible to obtain a boron carbide sintered body having fewer restrictions on the size and shape.

Preferably, the first reference temperature is not less than 2,100° C. and not more than 2,300° C., and the second reference temperature is not less than 2,200° C. and not more than 2,350° C. Thereby, graphite dissolves sufficiently in the step of firing the compact, thus increasing sinterability of the boron carbide. Then graphite precipitates, so that the number ratio Rn is preferably not less than 80%. As a result, the boron carbide sintered body having excellent grindability can be obtained. The heating rate is preferably controlled so as to be 1,000° C./hour to 1,200° C./hour in the temperature range of the first reference temperature to the second reference temperature in order that (Lp/La) may be not less than 0.3, where in a cross sectional view of the resulting sintered body, La is a length of circumference of the pore, and Lp is a length of the whole circumference of the exposed graphite particle.

Specifically, the compact is held in the first reference temperature range of not less than 2,100° C. to not more than 2,300° C. for 10 minutes to 10 hours. Then the compact is held in the second reference temperature range of 2,200° C. to 2,350° C. for 10 minutes to 20 hours. Thereby, the compact is densified to have a relative density of 90% or more. The heating rate is preferably 1° C./min to 30° C./min. The holding time refers to the total time the compact is held in the predetermined temperature range. For example, the holding time includes the period of time the compact is held at a constant temperature, the heating-up period, and the cooling-down period. When the compact is held at 2,000° C. or higher, the compact is preferably held in an argon gas or a helium gas so that boron carbide and the additives are not decomposed.

To further promote densification, when the open porosity of the sintered body reaches 5% or less, the sintered body may be pressurized by a high-pressure gas. It is preferable to employ a method of pressurizing the sintered body by high-pressure gas pressure sintering (GPS) or hot isostatic press (HIP) at a gas pressure of 1 to 300 MPa. This increases the relative density to 95% or more. Alternatively, as needed, sintering may be performed by a method of applying mechanical pressure, e.g., hot press or spark plasma sintering (SPS).

Figure 2:
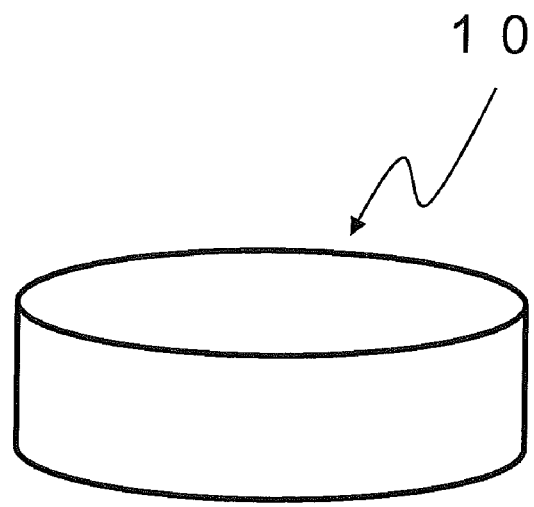
FIG. 2 is a perspective view of a boron carbide sintered body according to another embodiment of the present invention.
Figure 3:
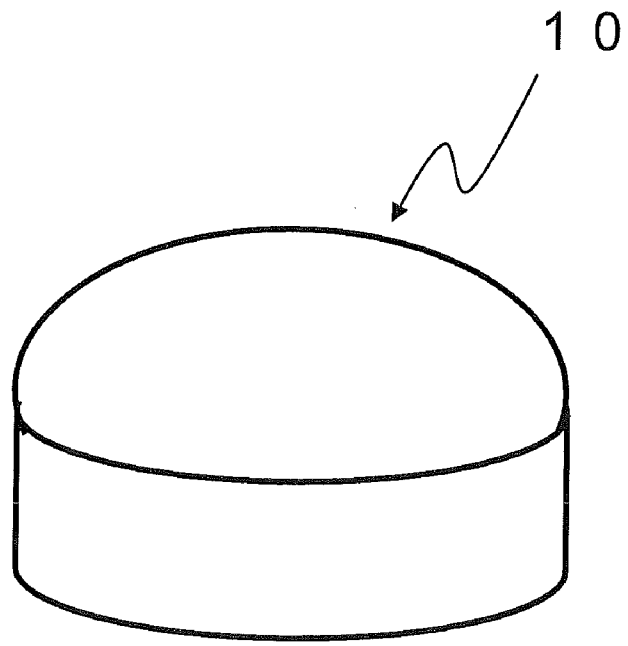
FIG. 3 is a perspective view of a boron carbide sintered body according to another embodiment of the present invention.
Figure 4:
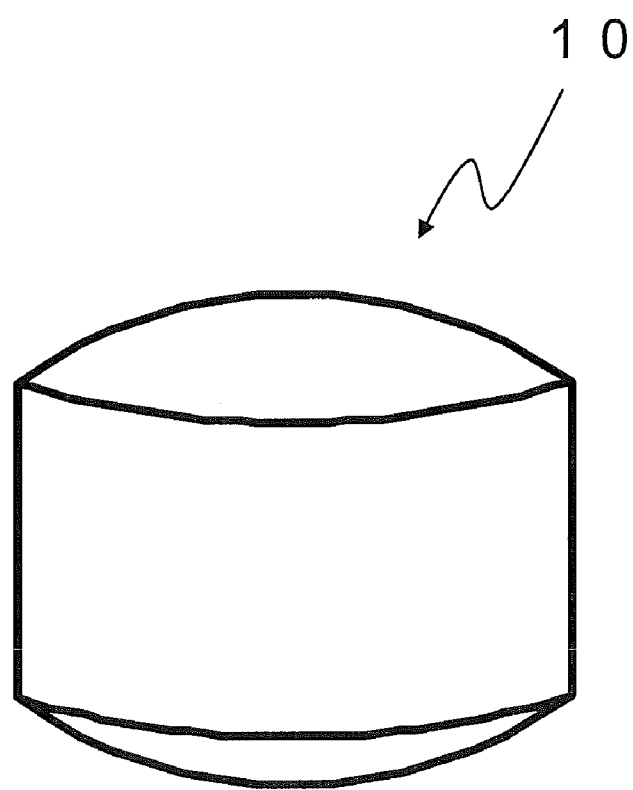
FIG. 4 is a perspective view of a boron carbide sintered body according to another embodiment of the present invention.
Figure 5A:
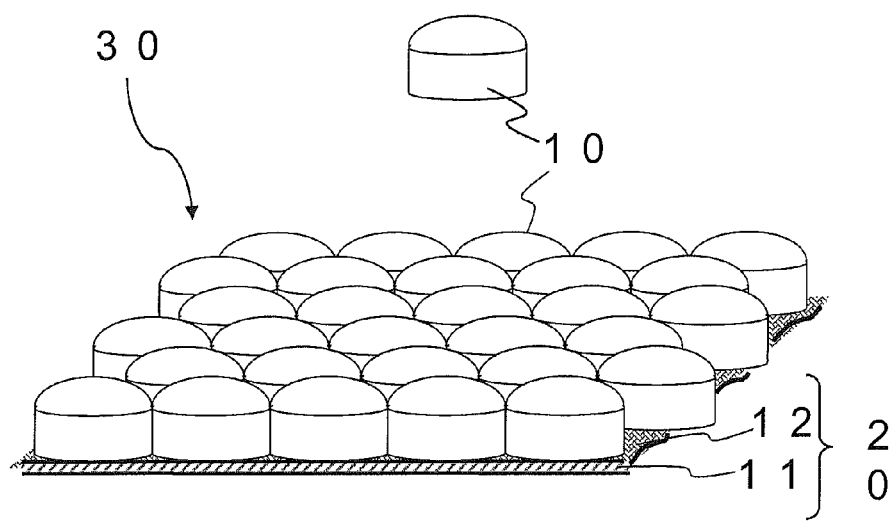
FIG. 5A is a perspective view of part of an protective body according to another embodiment of the invention, with the boron carbide sintered body illustrated in FIG. 1.
Figure 5B:
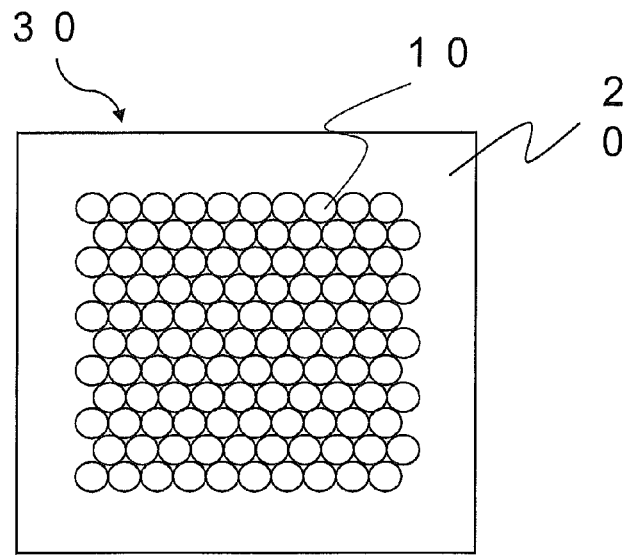
FIG. 5B is a plan view of the protective body illustrated in FIG. 5A.

An embodiment in which the above-described boron carbide sintered body is used as a protective member will be described below. A sintered body 10 used as a protective member has a columnar shape as shown in FIG. 2 or a columnar shape in which a top surface is convex as shown in FIG. 3. Alternatively, as shown in FIG. 4, a top surface and a bottom surface may each be convex. The sintered body preferably has a columnar shape and preferably has an outer diameter of 12 to 14 mm and a height of 10 to 14 mm.

In the sintered body having the top surface, the bottom surface, and a side circumferential surface connecting the periphery of the top surface and the periphery of the bottom surface, the boron carbide sintered body in which at least one of the top surface and the bottom surface is convex can be suitably used as a protective member. In the case where boron carbide sintered body in which one of the top surface and the bottom surface is convex, the convex surface is preferably used as an impact-receiving surface.

A protective body according to an embodiment will be described below. The plurality of sintered bodies 10 are arranged on a substrate 11 and are attached to the substrate 11 with an adhesive member 12. The substrate 11 and the adhesive member 12 constitute a base 20. The substrate 11 may be rigid or flexible. As a rigid substrate, a plastic or metal may be used. As a material for the adhesive member 12, a resin such as a urethane adhesive may be used.

In the case where a flying object collides with the convex surface of the sintered body 10, the probability that an angle defined by the direction of movement of the flying object and the normal to the surface of the sintered body 10 is 90° is markedly reduced. Thereby, the flying object collides with the surface of the sintered body 10 and slides on the surface. As a result, bombarding energy is relaxed, thus suppressing the occurrence of a crack in the sintered body 10. Thus, a protective body 30 has a structure that sufficiently reduces the penetration of a flying object such as a bullet and a shell. Therefore, the protective body 30 can sufficiently protect a human body, a vehicle, a ship, an aircraft, and a building.

Example

EXAMPLE will be described in detail below.

A boron carbide powder containing 0.2% by mass Fe was prepared. The boron carbide powder had a particle size distribution such that $D_{50}=0.65$ µm, $D_{90}=1.40$ µm, and $D_{90}/D_{50}=2.2$, where $D_{50}$ is defined as a particle size at 50% cumulation, and $D_{90}$ is defined as a particle size at 90% cumulation, counted from a smaller size side in a cumulative particle size distribution. A graphite powder and a silicon carbide powder as sintering additives were weighed in such a manner that the proportions thereof shown in Table 1 were achieved.

These powders were charged into a rotation mill together with milling media made of boron nitride sintered bodies. The resulting mixture was mixed for 12 hours in acetone to form a slurry. The slurry passed through a nylon screen having a mesh size of #200 to remove coarse foreign matter. After the resulting slurry was dried at 120° C., the resulting powder passed through a nylon screen having a mesh size of #40 to uniformize the particle size. Thereby, a material powder was produced.

The resulting material powder was molded by powder pressing using a metal die so as to form columnar compacts each having a diameter of 6 mm, a height of 15 mm, and a relative density of 58%. Then the compacts were calcined at 600° C. under nitrogen gas flow to remove organic components contained in the compacts.

The calcined compacts were placed in a firing jig made of graphite sintered body. The firing jig was placed in a firing furnace provided with a resistive heating element formed from graphite. The compacts were heated at a heating rate of 20° C./min. A vacuum atmosphere was used below 1,600° C. An argon gas atmosphere having a pressure of 110 kPa was used at 1,600° C. or higher. The compacts were held for 1 to 3 hours at the first reference temperatures shown in Table 1. Then the compacts were further heated and held for 1 to 2 hours at the second reference temperatures shown in Table 1. Thereby, Samples 1 to 23 each having a columnar shape, a diameter of 5 mm, and a height of 12.5 mm were produced.

Specimens were cut out from Samples. Graphite and silicon carbide present on a surface of each specimen were identified and quantified by X-ray diffraction, ICP spectroscopy, and the like. The porosity was measured by Archimedes' method. Rn, (Lp/La), and the mean maximum length of the graphite particles were determined by image analysis with a scanning electron microscope (SEM). A 1,000× secondary electron image of any area on the polished surface of each specimen was observed. The maximum lengths of 25 crystal grains of graphite observed on the polished surface were measured. The mean value thereof is calculated to obtain the mean maximum length of the graphite particles. The polished surface was obtained as described below. Polishing was performed with an apparatus for preparing a scanning electron microscope specimen (cross section polisher, SM-09010, produced by JEOL Ltd.) under the following conditions: an acceleration voltage of argon ions with which the cross section was irradiated was set to 6 kV; the flow rate of an argon gas was controlled in such a manner that a current was 70% to 80% of the maximum of an argon ion current; and the polishing time was 8 hours.

Vickers hardness was measured at a load of 9.807N (1 kgf) by a Vickers hardness test according to JIS R 1610-2003, hereby incorporated by reference. Thereby, the characteristics of the sintered body samples shown in Table 1 were obtained.

Disk samples each having a diameter of 80 mm and a thickness of 10 mm were formed by the same production method as above to evaluate grind resistance.

Specifically, these samples were fixed in a vertical machining center (model VM4II, manufactured by Osaka Kiko Corporation). A drill having an outer diameter of 5 mm and #120 diamond formed by electrodeposition was mounted on the machining center. A hole was drilled in each sample in the direction perpendicular to a main surface of the sample at a number of rotations of the drill of 2,000 rpm and a feed rate of 2 mm/min while water was fed to the drill. The grind resistance (N) generated during drilling was measured with a quartz piezo-electric dynamometer (TYPE9254, manufactured by Kistler Corporation).

As COMPARATIVE EXAMPLE, a sample was produced by hot isostatic press (HIP). The sample was measured as in EXAMPLE, except that HIP was employed.

Table 1 shows measurement values obtained by these measurement methods.

These samples were preferred because these samples had grind resistance lower than those in Samples 8 and 9 in which graphite or silicon carbide was out of the above ranges.

In Samples 3 to 7, 13 to 18, and 20 to 23, the mean maximum length of the graphite particles was not less than 1 μm and not more than 15 μm. Thus, these samples had hardness higher than that of Sample 11 in which the mean maximum length of the graphite particles was out of the above range.

Samples 4 to 9, 13 to 18, and 20 to 23 each had low grind resistance and a porosity of 10% or less and were preferable

TABLE 1

| Sample No. | Firing method | Firing condition | | Characteristics of sintered body | | | | | Evaluation | |
|---|---|---|---|---|---|---|---|---|---|---|
| | | First reference temperature °C. | Second reference temperature °C. | Proportion | | Porosity % | (Lp/La) | Mean maximum length μm | hardness GPa | Grind resistance N |
| | | | | Graphite mass % | Silicon carbide mass % | | | | | |
| 1 | Pressureless firing | 2100 | 2300 | 0 | 5 | 12 | 0 | 0 | 19 | 610 |
| 2 | Pressureless firing | 2100 | 2300 | 5 | 0 | 13 | 0.5 | 5 | 18 | 590 |
| 3 | Pressureless firing | 2100 | 2250 | 1 | 0.1 | 11 | 0.3 | 3 | 20 | 550 |
| 4 | Pressureless firing | 2100 | 2300 | 1 | 0.1 | 10 | 0.3 | 3 | 25 | 760 |
| 5 | Pressureless firing | 2100 | 2300 | 5 | 4 | 4 | 0.7 | 8 | 30 | 710 |
| 6 | Pressureless firing | 2100 | 2300 | 10 | 5 | 7 | 0.8 | 14 | 26 | 740 |
| 7 | Pressureless firing | 2100 | 2300 | 20 | 10 | 10 | 0.8 | 16 | 25 | 770 |
| 8 | Pressureless firing | 2100 | 2300 | 21 | 10 | 10 | 0.8 | 16 | 26 | 830 |
| 9 | Pressureless firing | 2100 | 2300 | 20 | 11 | 10 | 0.8 | 16 | 26 | 830 |
| 10 | Pressureless firing | 2100 | 2300 | 30 | 20 | 17 | 0.9 | 18 | 15 | 570 |
| 11 | Pressureless firing | 2000 | 2300 | 5 | 3 | 18 | 0.1 | 0.5 | 14 | 600 |
| 12 | Pressureless firing | 2100 | 2100 | 5 | 3 | 30 | 0.1 | 0.8 | 11 | 480 |
| 13 | Pressureless firing | 2100 | 2200 | 5 | 3 | 9 | 0.3 | 3 | 25 | 760 |
| 14 | Pressureless firing | 2100 | 2250 | 5 | 3 | 6 | 0.4 | 5 | 29 | 750 |
| 15 | Pressureless firing | 2100 | 2300 | 5 | 3 | 4 | 0.8 | 8 | 30 | 700 |
| 16 | Pressureless firing | 2200 | 2300 | 5 | 3 | 7 | 0.6 | 12 | 26 | 740 |
| 17 | Pressureless firing | 2200 | 2300 | 5 | 3 | 3 | 0.5 | 13 | 29 | 730 |
| 18 | Pressureless firing | 2300 | 2350 | 5 | 3 | 5 | 0.5 | 15 | 29 | 760 |
| 19 | Pressureless firing | 2350 | 2300 | 5 | 3 | 10 | 0.2 | 16 | 25 | 790 |
| 20 | Pressureless firing | 2100 | 2420 | 5 | 3 | 0.9 | 0.1 | 1 | 32 | 780 |
| 21 | Pressureless firing | 2100 | 2400 | 5 | 3 | 1 | 0.1 | 1 | 31 | 820 |
| 22 | Pressureless firing | 2100 | 2300 | 5 | 3 | 4 | 0.7 | 7 | 30 | 720 |
| 23 | Pressureless firing | 2100 | 2300 | 5 | 3 | 3 | 0.8 | 6 | 30 | 770 |
| 24 | HIP | | | 5 | 3 | 0.8 | 0.1 | 8 | 34 | 920 |

(Lp/La): La is a length circumference of a pore.
Lp is a length circumference of an exposed graphite particle.

As shown in Table 1, in Samples 1 and 2, graphite or silicon carbide was absent, thereby resulting in low hardness.

In Sample 12, the first reference temperature was low and equal to the second reference temperature, thereby resulting in insufficient precipitation of graphite. Therefore, hardness was low.

In Sample 19, the first reference temperature was higher than the second reference temperature, thereby promoting densification. Therefore, grind resistance was high.

In Sample 24, firing was performed by hot isostatic press (HIP), thereby promoting densification. Therefore, grind resistance was high.

In samples (Samples 3 to 11, 13 to 18, and 20 to 23) having a plurality of graphite particles and a plurality of pores, most of the graphite particles being exposed to the pores or disposed in the vicinity of the pores, each of the samples was a boron carbide sintered body having low grind resistance and good grindability while high hardness was maintained.

In particular, in each of Samples 3 to 7, 11, 13 to 18, and 20 to 23, the content of graphite was not less than 1% and not more than 20% by mass of a boron carbide sintered body, and the content of silicon carbide was not less than 0.1% and not more than 10% by mass of a boron carbide sintered body. because these samples had hardness higher than those of Samples 3, 10, and 11 each having a porosity exceeding 10%. In particular, Samples 5, 14, 15, 17, 18, and 20 to 23 each having a porosity of not less than 1% not more than 6% were more preferable because these samples had a good balance between hardness and grind resistance compared with Samples 4, 6 to 9, and 13 to 16 each having porosity out of the above range.

Samples 3 to 10, 13 to 18, 22, and 23 each had a ratio (Lp/La) of not less than 0.3. These samples were preferable because these samples each had a good balance between hardness and grind resistance compared with Samples 11, 20, and 21 each having a ratio (Lp/La) of less than 0.3.

The Examples described herein are only illustrative of the invention, the scope of which is defined by the claims following.

What is claimed is:

1. A boron carbide sintered body having a plurality of pores, comprising:
   a boron carbide as a main component,
   a plurality of graphite particles dispersed in the sinter, a majority of the graphite particles being exposed to the pores.

2. The boron carbide sintered body according to claim 1, further comprising a silicon carbide.

3. The boron carbide sintered body according to claim 1, wherein the graphite particles have an anisotropic shape.

4. The boron carbide sintered body according to claim 1, wherein a mean maximum length of the graphite particles is not less than 1 micron and not more than 15 microns.

5. The boron carbide sintered body according to claim 1, having a porosity of not more than 10%.

6. The boron carbide sintered body according to claim 5, wherein the porosity is not less than 1% and not more than 6%.

7. The boron carbide sintered body according to claim 1, wherein the sintered body has a top surface, a bottom surface, and a side circumferential surface connecting a periphery of the top surface and a periphery of the bottom surface, and at least one of the top surface and the bottom surface is a convex surface.

8. The boron carbide sintered body according to claim 1, wherein a ratio of the length of the circumference of the cross-section of a graphite particle exposed to a pore to the length of the circumference of the cross-section of said pore (Lp/La) is not less than 0.3.

9. The boron carbide sintered body according to claim 1, wherein a number of the graphite particles exposed to the pores is not less than 80% of the sum of the number of all of the graphite particles which are exposed to the pores and are disposed within 40 microns of the circumference of a pore.

10. A method of manufacturing a boron carbide sintered body, comprising:
mixing a boron carbide, graphite, and a silicon carbide to obtain a basic material,
molding the basic material to obtain a compact,
firing the compact to dissolve the graphite in the compact at a first reference temperature, heating the compact up to a second reference temperature higher than the first reference temperature, and
cooling the compact to precipitate the dissolved graphite, thereby obtaining a boron carbide sintered body having a plurality of pores and comprising a boron carbide as a main component and a plurality of graphite particles dispersed in the sinter, a majority of the graphite particles being exposed to the pores.

11. The method of manufacturing a boron carbide sintered body according to claim 10, wherein the firing is a pressureless firing.

12. The method of manufacturing a boron carbide sintered body according to claim 10, wherein the first reference temperature is not less than 2100° C. and not more than 2300° C., and the second reference temperature is not less than 2200° C. and not more than 2350° C.

13. A protective body, comprising: a plurality of the boron carbide sintered bodies according to claim 1, and a substrate on which the sintered bodies are disposed.

14. A boron carbide sintered body having a plurality of pores, comprising:
a boron carbide as a main component,
a plurality of graphite particles dispersed in the sinter, a majority of the graphite particles being exposed to the pores, and
a silicon carbide,
wherein a content of the graphite particles is not less than 1% and not more than 20% by mass of the sintered body, and a content of the silicon carbide is not less than 0.1% and not more than 10% by mass of the sintered body.

15. The boron carbide sintered body according to claim 14, wherein the graphite particles have an anisotropic shape wherein a mean maximum length of the graphite particles is not less than 1 micron and not more than 15 microns.

16. The boron carbide sintered body according to claim 14, wherein the porosity is not less than 1% and not more than 6%.

17. A protective body, comprising: a plurality of the boron carbide sintered bodies according to claim 14, and a substrate on which the sintered bodies are disposed.

18. The boron carbide sintered body according to claim 9, wherein the graphite particles have an anisotropic shape wherein a mean maximum length of the graphite particles is not less than 1 micron and not more than 15 microns.

19. The boron carbide sintered body according to claim 9, wherein the porosity is not less than 1% and not more than 6%.

20. A protective body, comprising: a plurality of the boron carbide sintered bodies according to claim 9, and a substrate on which the sintered bodies are disposed.

* * * * *